United States Patent [19]

Takada

[11] Patent Number: 4,547,333

[45] Date of Patent: Oct. 15, 1985

[54] APPARATUS FOR BIAXIAL-BLOW-MOLDING HOLLOW BOTTLE-SHAPED CONTAINER OF SYNTHETIC RESIN AND METHOD OF BIAXIAL-BLOW-MOLDING THE SAME CONTAINER

[75] Inventor: Takuzo Takada, Ojima, Japan

[73] Assignee: Yoshino Kogyosho Co., Ltd., Tokyo, Japan

[21] Appl. No.: 466,784

[22] Filed: Feb. 14, 1983

[30] Foreign Application Priority Data

Feb. 15, 1982 [JP] Japan .................. 57-19485

[51] Int. Cl.$^4$ ............................................. B29C 17/07
[52] U.S. Cl. .................... 264/532; 264/531; 425/529; 425/537; 425/444
[58] Field of Search ................ 264/531, 532; 425/529, 425/537, 444

[56] References Cited

U.S. PATENT DOCUMENTS

| 3,914,086 | 10/1975 | Hujik .................... 425/444 X |
| 4,261,473 | 4/1981 | Yamada et al. ............ 264/532 X |
| 4,364,721 | 12/1982 | Rainville ................. 264/531 X |
| 4,457,688 | 7/1984 | Calvert et al. ............ 425/529 X |

FOREIGN PATENT DOCUMENTS

| 1053380 | 3/1959 | Fed. Rep. of Germany ...... 425/444 |
| 1904753 | 8/1970 | Fed. Rep. of Germany ...... 264/531 |
| 2610259 | 8/1977 | Fed. Rep. of Germany ...... 425/533 |
| 2705775 | 8/1978 | Fed. Rep. of Germany ...... 264/530 |

Primary Examiner—Jan Silbaugh
Attorney, Agent, or Firm—Parkhurst & Oliff

[57] ABSTRACT

An apparatus for biaxial-blow-molding a hollow bottle-shaped container of a synthetic resin which has a bottom mold having an upper surface becoming the bottom mold surface of the bottle-shaped container and a cylinder chamber formed therein, a bottom protruding pin having an upper end face forming part of the bottom mold surface of the bottom mold and a piston portion formed at the bottom end thereof and telescopically moved back and forth in the cylinder chamber of the bottom mold, and an elastic member disposed in the cylinder chamber of the bottom mold for urging the bottom protruding pin forwardly when the member is contacted with the piston portion of the bottom protruding pin in such a manner that the tension of the member is weaker than the pressure of compressed air to be blown into the molds. This apparatus is operated by a method of biaxial-blow-molding the hollow bottle-shaped container of a synthetic resin of the invention. Thus, the bottom of the blow-molded piece or parison adhered to the bottom of the blowing mold at the time of blow-molding can be readily released from upon opening of the split molds after the piece is completely blow-molded.

6 Claims, 3 Drawing Figures

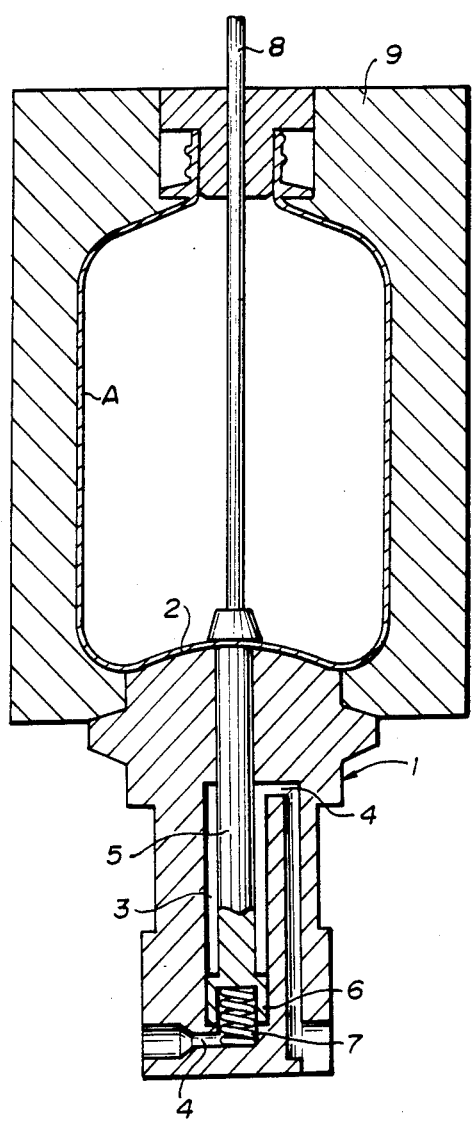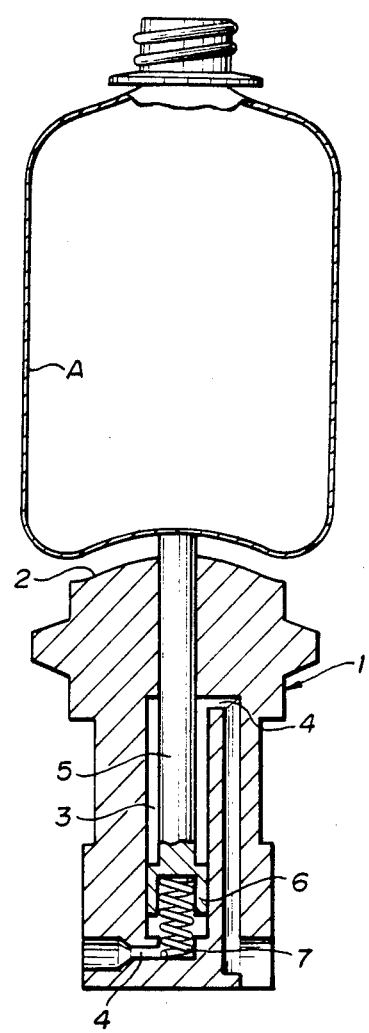

APPARATUS FOR BIAXIAL-BLOW-MOLDING HOLLOW BOTTLE-SHAPED CONTAINER OF SYNTHETIC RESIN AND METHOD OF BIAXIAL-BLOW-MOLDING THE SAME CONTAINER

BACKGROUND OF THE INVENTION

This invention relates to an apparatus for biaxial-blow-molding a hollow bottle-shaped container of a synthetic resin and a method of biaxial-blow-molding the same container.

A conventional biaxial-blow-molding apparatus for synthetic resin products is constructed to heat pieces or parisons of preformed injection molding articles molded in advance at a predetermined temperature, then associate the pieces in blowing molds, and to blow the pieces while orienting axially the pieces via orientation pins, thereby obtaining the products of desired shape.

However, the outer surface of the product thus blow-molded in the mold is substantially intimately contacted with the inner surface of the mold in the mold. Particularly when the product is heat treated such as a heat set in the mold, the bottom surface of the product is adhered to the inner bottom surface of the mold. Thus, this conventional molding of the product has in a disadvantage that it is difficult to smoothly remove the product from the mold.

In the conventional biaxial-blow molding, the orienting center of the bottom of the piece, with which the pin makes contact at the orienting time, is displaced so that the piece is formed in the unpreferable shape of a variety of shapes. This causes the blow-molded product to have an irregular thickness which is weaker in strength and poor in external appearance. In order to overcome this drawback and disadvantage, an orientation pin unit has been developed in which a bottom protruding pin for lightly holding the bottom of a piece or parison together with the end of the orientation pin is arranged along a rectilinear line of the orienting direction of the orientation pin to retract into the bottom of the mold while maintaining the holding state in synchronism with the displacing operation of the orientation pin, thereby preventing the displacement of the orientation pin of the bottom of the piece.

SUMMARY OF THE INVENTION

Accordingly, an object of the present invention is to provide an apparatus for biaxial-blow-molding a hollow bottle-shaped container of a synthetic resin which can eliminate all the aforementioned drawbacks and disadvantages of the conventional biaxial-blow-molding apparatus and which can prevent the displacement of the orienting center of the bottom of a piece or parison injection-molded in advance, thereby molding the bottle-shaped container having no irregular thickness.

Another object of the present invention is to provide an apparatus for biaxial-blow-molding a hollow bottle-shaped container of a synthetic resin which can simply perform the smooth removal of the bottle-shaped container thus blow-molded from the bottom of the mold by means of the protrusion of a bottom protruding pin retracted once into the bottom of the mold after the completion of the blow-molding by utilizing the bottom protruding pin of the above-described orientation pin unit.

Still another object of the present invention is to provide a method of biaxial-blow-molding a hollow bottle-shaped container of a synthetic resin, which can smoothly remove the bottle-shaped container blow-molded in a biaxial-blow-molding apparatus from a blowing mold by protruding a pin in a forward direction by an elastic material arranged in a cylinder chamber of the mold upon opening of the mold.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIG. 2 is a sectional view of the apparatus after the bottle-shaped container is blow-molded; and FIG. 3 is a sectional view showing the state in which the blow-molded product is released from the opened split molds.

DESCRIPTION OF THE PREFERRED EMBODIMENTS

Figure 1:
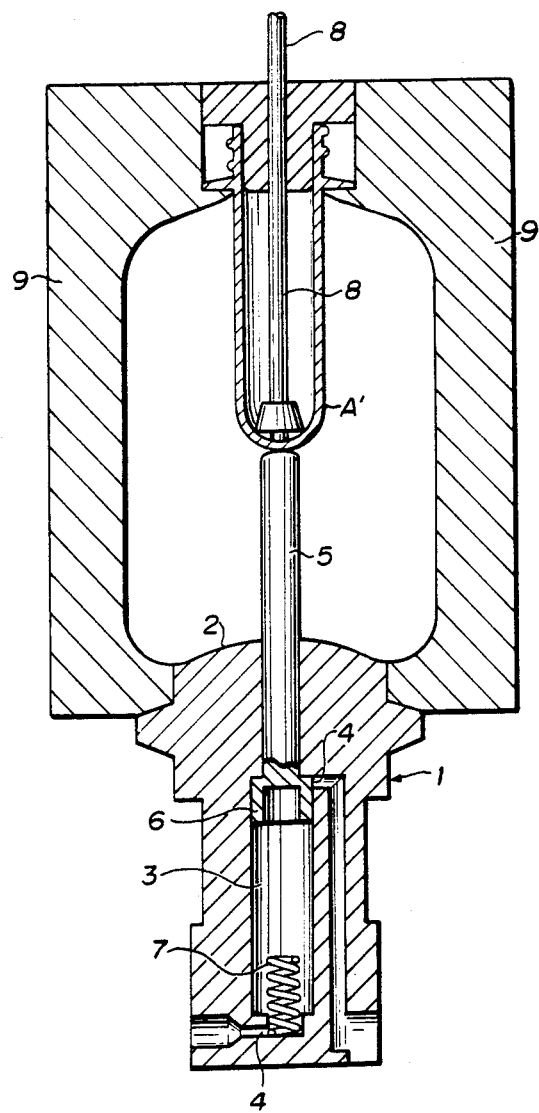
FIG. 1 is a sectional view of a preferred embodiment of an apparatus for biaxial-blow-molding a hollow bottle-shaped container of a synthetic resin according to the present invention before a blow-molding operation.

The present invention will now be described in more detail with reference to the accompanying drawings.

In the drawings, reference numeral 1 designates a bottom mold. The upper surface of the bottom mold 1 becomes the bottom mold surface 2 to become the bottom of a product or a hollow bottle-shaped container A of a synthetic resin to be blow-molded. The mold 1 has a cylinder chamber 3 formed therein and opened at the top end with the mold surface 2, and air intake and exhaust holes 4 and 4 formed at the upper and lower parts of the chamber 3.

Reference numeral 5 depicts a bottom protruding pin. The top surface of the pin 5 form part of the bottom mold surface 2. The lower end of the pin 5 is formed with a piston 6, which is telescoped in the cylinder chamber 3. The piston 6 is telescoped back and forth by means of the intake and exhaust of air through the intake and exhaust holes 4 and 4. The pin 5 is arranged to lightly hold the bottom of a preformed injection-molded piece or parison A' to become the orienting center of the piece A' between the pin 5 and the end face of an orientation pin 8, which is secured to the top of split molds 9 for directly biaxial-blow-molding the piece A' in an axial direction. The pin 5 is displaced to be retracted into the cylinder chamber 3 together with the orientation pin in this state. The top surface of the pin 5 becomes smoothly continued surface with the bottom mold surface 2 when the pin 5 is retracted to the retraction limit in the cylinder chamber 3.

The piece A' is suspended at the top from the neck portion molding sections of the split molds 9 in the cavity of the molds 9. The pin 8 is inserted into the piece A' in such a manner that the bottom end of the pin 8 is contacted with the inner surface of the bottom wall of the piece A'. Thus, the piece A' is axially oriented by pressing down the pin 8 in the cavity of the molds 9.

Further, a coiled resilient member 7 is associated within the bottom of the chamber 3. The top end of the member 7 is contacted with the bottom of the piston 6 of the pin 5 in the vicinity of the retraction limit into the chamber 3. Thus, the resilient member 7 is operated to elastically move upwardly the piston 6 and hence the pin 5 towards the split molds 9.

In the apparatus as described above, when the piece A' is loaded in the molds 9 in the state that air is introduced from the lower hole 4 to move upwardly the pin 5 into the molds 9, the molds 9 are then clamped and are biaxially blow-molded (from the state shown in FIG. 1). The pin 5 is retracted synchronously with the pin 8 in the state that the pin 5 lightly holds the bottom of the piece A' to become the orienting center between the pin 5 and the bottom end surface of the pin 8. In this manner, the piece A' is blow-molded in the molds 9, thereby blow-molding a bottle-shaped container A of a synthetic resin (as shown in FIG. 2).

The pin 5 is driven upwardly by the tension of the resilient member 7 at the position in the vicinity of the retraction limit into the bottom mold 1, but is continuously retracted to the retraction limit by the pressure produced in the cavity of the molds 9 at the blowing time and the continuous supply of the air into the cylinder chamber 3 (as shown in FIG. 2), thereby blow-molding the bottle-shaped container A.

When the molds 9 are opened after the container A is completely biaxially blow-molded, the container A is forcibly released from the bottom mold 1 by the protrusion of the pressure of the member 7 to the pin 5. In this manner, the blow-molded container A can be readily released from the blowing mold.

Therefore, the pin 8 and the pin 5 should displace at a predetermined interval. An irregular thickness would, if otherwise, occur at the center of the bottom of the blow-molded container A. In this manner, the pressure of the member 7 in the vicinity of the retraction limit of the pin 5 must not be stronger than the opposite pressure of the pin 8 in the cavity of the molds 9, and the protrusion of the pin 5 after the blow molding by the member 7 may operate in the vicinity of the retraction limit of the pin 5, because the bottom of the container A thus blow-molded may release from the bottom mold surface 2.

According to the present invention as described above, the apparatus for biaxial-blow-molding the hollow bottle-shaped container of synthetic resin is constructed to have the bottom protruding pin telescopically inserted into the bottom mold to prevent the displacement of the orienting center of the orientation pin at the bottom of the preformed piece at the blowing time so as to eliminate the irregular thickness of the bottle-shaped container and the resilient member arranged in the cylinder chamber of the bottom mold to be engaged with the bottom protruding pin after the blow molding of the container for slightly protruding the bottom protruding pin disposed at the retraction limit forwardly so as to release readily the bottom of the container from the bottom of the split molds.

Therefore, the bottle-shaped container thus blow-molded is in a state that the bottom of the container adhered to the bottom of the split molds at the blow-molding time can be protruded by the protrusion of the bottom protruding pin upwardly, and the container can be thus released readily from the split molds.

The release of the bottom of the blow-molded bottle-shaped container is performed in the apparatus thus constructed, is performed by a method of biaxial-blow-molding the same container as will be described.

In the method, the pin 5 is telescopically protruded into the cavity of the clamped split molds 9 through the bottom mold 1 along the central axis of the space, and the pin 5 is telescopically inserted into the cylinder chamber 3 formed in the mold 1.

In biaxial-blow-molding of the bottle-shaped container A, the piece A' is suspended at the upper end from the neck portion space of the split molds 9 in the space the cavity of the molds 9. The orientation pin 8 is inserted into the piece A' so that the lower end of the pin 8 is contacted with the inner surface of the bottom wall of the piece A'. Thus, the piece A' is axially oriented by pressing down the pin 8. Prior to the depression of the pin 8, the bottom of the piece A' is held between the upper end face of the pin 5 and the bottom end surface of the pin 8, and both the pins 5 and 8 are moved simultaneously downwardly while maintaining the holding state of the bottom of the piece A'. In this manner the piece A' is axially oriented by extending the pin 8. After this axial orientation of the piece A' or at the downward movements of both the pins 5 and 8, compressed air is blown into the piece A' and the piece A' is laterally oriented. The compressed air may be blown into the piece A' between the outer peripheral surface of the pin 8 and the upper inner surface of the piece A' after the pin 8 is removed or in the state when the pin 8 is pressed into the space of the molds 9.

What is claimed is:

1. An apparatus for biaxial-blow-molding a hollow bottle-shaped container of a synthetic resin comprising:
   a mold comprising a bottom mold portion and an upper mold portion, said bottom mold portion having an upper surface for forming a bottom surface of a bottle-shaped container, and a cylinder chamber formed therein, said upper mold portion having a cavity for forming the bottle-shaped container, said upper portion being split into a plurality of upper mold sections;
   a reciprocally movable orientation pin extending from one end of said upper mold portion into the cavity and towards said upper surface of said bottom mold portion and movable in opposition to a bottom protruding pin during blow molding to a position wherein a lower end of said orientation pin is adjacent said bottom surface;
   a bottom protruding pin movable reciprocally in said mold cavity and having an upper end face at a first end thereof, said upper end face forming part of said upper surface of said bottom mold portion wherein said bottom protruding pin is retracted and a piston portion formed at a second end thereof, said piston portion being movable reciprocally in said cylinder chamber for moving said bottom protruding pin reciprocally in said mold cavity; and
   a resilient member disposed in said cylinder chamber for urging said bottom protruding pin into said mold cavity by contacting said resilient member with said piston portion of said bottom protruding pin for releasing said container from said bottom mold portion whereby pressure exerted on said bottom protruding pin by said resilient member when said bottom protruding pin is in the vicinity of its retraction limit is not greater than an opposite pressure exerted by said orientation pin in said mold cavity during blow molding, said resilient member being contacted by and compressed substantially only when said piston portion is in the vicinity of the retraction limit of said bottom protruding pin.

2. The apparatus according to claim 1, wherein said bottom mold portion comprises an air intake hole formed at an upper portion of said cylinder chamber and an air exhaust hole formed at a lower portion of said cylinder chamber.

3. The apparatus according to claim 1, wherein a parison to be blow-molded into a bottle-shaped container is held at a bottom portion thereof between said orientation pin and said upper end face of said bottom protruding pin when said parison is axially oriented.

4. A method of biaxial-blow-molding a hollow bottle-shaped container of a synthetic resin comprising the steps of:

inserting a retractable bottom protruding pin through an upper surface of a bottom mold portion and a bottom wall of an upper mold portion along a central axis thereof, said bottom protruding pin having an upper surface positioned in a cavity of said upper mold portion;

suspending a parison in said cavity of said upper mold portion by holding a neck portion of said parison at an upper section of said upper mold portion;

inserting an orientation pin into said parison;

holding a bottom portion of said parison between a bottom end face of said orientation pin and said upper surface of said bottom protruding pin;

moving said orientation pin towards said bottom mold portion and retracting said bottom protruding pin simultaneously into said cylinder chamber while holding said bottom portion of said parison between said bottom end face of said orientation pin and said upper surface of said bottom protruding pin, thereby axially orienting said parison wherein pressure exerted by said orientation pin during blow molding is greater than an opposing pressure exerted by a resilient member on said piston portion of said bottom protruding pin only in the vicinity of the retraction limit of said protruding pin;

blowing compressed air into said parison thereby laterally orienting said parison to form a blow-molded bottleshaped container; and extending said bottom protruding pin towards a bottom portion of said blow-mold bottle-shaped container by a pressure exerted on said piston portion of said bottom protruding pin by said resilient member thereby releasing said blow-molded bottle-shaped container from said upper surface of said bottom mold portion.

5. The method according to claim 4, wherein compressed air is blown into said parison simultaneously with axial orientation of said parison.

6. The method according to claim 4, wherein compressed air is blown into said parison after axial orientation of said parison.

* * * * *